Figure 1:
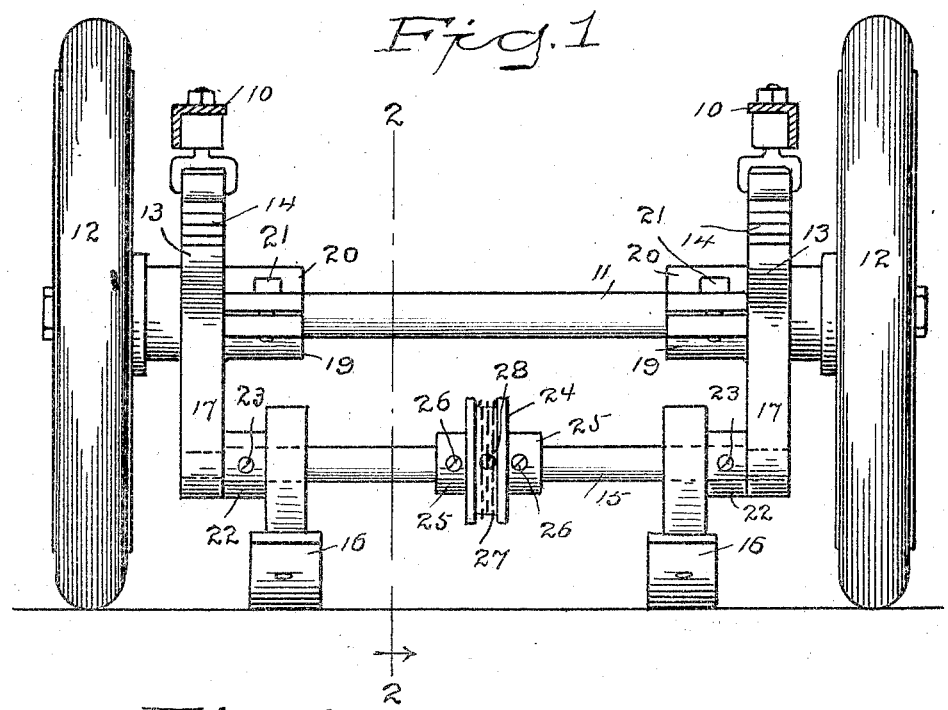

No. 850,414. PATENTED APR. 16, 1907.
J. A. BIRDSALL.
EMERGENCY BRAKE.
APPLICATION FILED NOV. 9, 1906.

WITNESSES
H. A. Lamb.
S. W. Atherton.

INVENTOR
John A. Birdsall
BY
N. Wooster
ATTORNEY

UNITED STATES PATENT OFFICE.

JOHN A. BIRDSALL, OF BETHEL, CONNECTICUT.

EMERGENCY-BRAKE.

No. 850,414.

Specification of Letters Patent.

Patented April 16, 1907.

Application filed November 9, 1906. Serial No. 342,656.

*To all whom it may concern:*

Be it known that I, JOHN A. BIRDSALL, a citizen of the United States, residing at Bethel, county of Fairfield, State of Connecticut, have invented a new and useful Emergency-Brake, of which the following is a specification.

This invention has for its object to provide an emergency-brake for automobiles, which may be applied to old or new machines and which shall be so simple and strong in construction that it will be practically impossible to get out of repair and be certain in use when required.

With these ends in view I have devised the simple and novel brake, of which the following description in connection with the accompanying drawings is a specification, reference characters being used to indicate the several parts.

Figure 2:
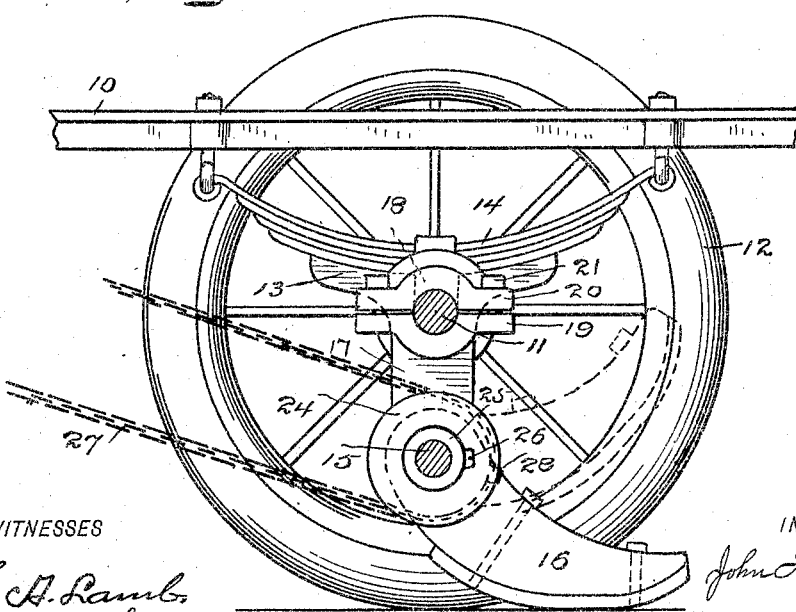

Figure 1 is an elevation of the rear axle of an automobile with my novel emergency-brake applied thereto, the frame of the automobile being in section; and Fig. 2 is a section on the line 2 2 in Fig. 1 looking toward the right.

10 denotes the frame of an automobile, which may be of any ordinary or preferred construction; 11, the rear axle; 12, the rear wheels; 13, bolsters, and 14 springs, to which the frame is attached.

It should be understood that the special construction of the automobile to which it is applied is wholly immaterial so far as the principle of the invention is concerned.

The essential feature of the invention is an oscillatory shaft, (indicated by 15,) carrying shoes (indicated by 16) which are normally swung upward out of the way, as indicated by dotted lines in Fig. 2, and in use are forced downward quickly against the ground, forming a drag, and if sufficient power is applied to the shaft will lift the rear axle and wheels from the ground, thus bringing the machine almost instantly to a standstill. As the driving mechanism of the automobile forms no portion of the present invention, I have omitted it entirely for the sake of clearness. The shaft is journaled in brackets 17, which may be suspended in any suitable manner from the rear axle. In the present instance I have shown these brackets as formed integral with the bolsters, although this is a detail of construction which may be varied to suit the requirements of different types of automobiles to which the brake is applied. In the present instance the bolsters are provided with slots 18 (shown in dotted lines only) to receive the axle, and the inner side of each bracket is provided with an inwardly-extending bearing-piece 19. Cap-pieces 20 are secured to the bearing-pieces by screws or bolts 21. The axle is loosely inclosed between the bearing-pieces and the cap-pieces, so as to permit the axle to rotate freely. The shoes may be secured to the shaft in any suitable manner. In the present instance I have shown the shoes as provided with hubs 22, through which the ends of the shaft are passed, the hubs being secured to the shaft by means of set-screws 23 or in any suitable manner.

The special mode in which the shaft is oscillated to set the brake is likewise not of the essence of the invention. In the present instance I have shown the shaft as provided with a pulley 24, whose hub 25 is locked thereto by means of set-screws 26 or in any suitable manner. A chain 27 is shown as passing about the pulley and as secured thereto by a screw 28. This chain extends to any suitable operating mechanism, (not shown,) as specifically it forms no portion of the present invention. It will be understood, of course, that it is immaterial so far as the brake itself is concerned how the power is applied to operate it.

It will be obvious that the operating means will necessarily vary greatly in different types of machines. It is sufficient for the purposes of this specification to say that the brake may be operated by means of a hand lever or wheel or a foot-lever conveniently placed for instant operation in the event of an emergency. The normal position of the shoes is indicated by dotted lines in Fig. 2. In case it is desired to stop the machine quickly the shaft is oscillated and the shoes forced down upon the ground, as indicated in full lines in Figs. 1 and 2. The shoes will drag upon the ground, and the application of sufficient power will lift the axle and wheels entirely from the ground, the weight of the rear portion of the machine being supported wholly by the shoes.

Having thus described my invention, I claim—

1. A brake of the character described comprising an oscillatory shaft, means for suspending said shaft rigidly below the rear axle of a vehicle, shoes carried directly by said shaft, and means for directly oscillating the shaft to force the shoes downward against the ground and raise the axle.

2. The combination with a vehicle, of rigidly-supported brackets extending below the rear axle of the vehicle, an oscillatory shaft journaled in said brackets, shoes extending rearwardly from said oscillatory shaft and rigidly connected therewith, and means for directly oscillating the shaft to force the shoes against the ground to raise the axle.

3. A brake of the character described comprising an oscillatory shaft, shoes carried thereby, a bolster having slots to receive the axle, and bearing-pieces, cap-pieces secured to the bearing-pieces and inclosing the axle loosely, brackets depending from the bolsters in which the shaft is journaled, and means for oscillating the shaft, substantially as described, for the purpose specified.

4. A brake of the character described comprising an oscillatory shaft, shoes carried directly thereby in position to bear on the ground, a pulley on said shaft, an operating-chain passing over said pulley and secured thereto and brackets adapted for attachment to an axle in which the shaft is journaled.

In testimony whereof I affix my signature in presence of two witnesses.

JOHN A. BIRDSALL.

Witnesses:
HOWARD H. WOODMAN,
WILLIAM PLATT, 2nd.